(12) United States Patent
Zheng et al.

(10) Patent No.: US 6,661,191 B2
(45) Date of Patent: Dec. 9, 2003

(54) METHOD AND APPARATUS FOR COMPENSATING DRIVE CURRENT FOR AN ELECTRIC MOTOR VEHICLE STEERING SYSTEM

(75) Inventors: Bing Zheng, Dublin, OH (US); Zhao Zilai, Dearborn Heights, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 97 days.

(21) Appl. No.: 10/060,846

(22) Filed: Jan. 30, 2002

(65) Prior Publication Data

US 2003/0141835 A1 Jul. 31, 2003

(51) Int. Cl.⁷ ................................................. H02P 7/00
(52) U.S. Cl. ........................ 318/434; 318/432; 180/6.2; 180/6.28
(58) Field of Search ................................ 318/432, 434; 180/6.2, 6.28

(56) References Cited

U.S. PATENT DOCUMENTS

| 4,618,808 | A |   | 10/1986 | Ish-Shalom et al. | 318/696 |
| 4,925,312 | A |   | 5/1990  | Onaga et al. | 364/513 |
| 4,980,620 | A |   | 12/1990 | Losic et al. | 318/268 |
| 4,992,944 | A | * | 2/1991  | Noto et al. | 701/41 |
| 5,398,953 | A | * | 3/1995  | Shimizu | 180/446 |
| 5,444,341 | A |   | 8/1995  | Kneifel, II et al. | 318/432 |
| 5,978,721 | A |   | 11/1999 | Kagawa et al. | 701/41 |
| 6,032,755 | A |   | 3/2000  | Blandino et al. | 180/446 |
| 6,034,496 | A |   | 3/2000  | Male | 318/439 |
| 6,046,554 | A |   | 4/2000  | Becerra | 318/254 |
| 6,046,560 | A |   | 4/2000  | Lu et al. | 318/432 |
| 6,107,767 | A |   | 8/2000  | Lu et al. | 318/561 |
| 6,160,955 | A |   | 12/2000 | Bicciato | 388/811 |
| 6,293,366 | B1| * | 9/2001  | Chabaan et al. | 180/446 |

FOREIGN PATENT DOCUMENTS

JP          110049014 A      11/1999

OTHER PUBLICATIONS

Dominke et al. "Method for controlling a steer–by–wire system" U.S. patent application Publication US 2003/0114969, Jun. 19, 2003.*

* cited by examiner

Primary Examiner—Rita Leykin
(74) Attorney, Agent, or Firm—Brinks Hofer Gilson & Lione

(57) ABSTRACT

An apparatus and method for a steering system which compensates a drive current for certain variables in a steer-by-wire and electrical power assist steering system. The present invention utilizes a steering wheel angle sensor, a road wheel angle sensor, and a controller for determining a precise time and amount of compensation for the drive current.

10 Claims, 2 Drawing Sheets

METHOD AND APPARATUS FOR COMPENSATING DRIVE CURRENT FOR AN ELECTRIC MOTOR VEHICLE STEERING SYSTEM

FIELD OF THE INVENTION

The present invention relates generally to a vehicle steering control system, and more particularly to a motor driver circuit for an electric steering control system.

BACKGROUND OF THE INVENTION

In the case of a so called "steer-by-wire" system for a motor vehicle, an electric motor actuator is provided for generating torque and applying the generated torque to a rack or linear steering member for steering of a vehicle. In the steer-by-wire system, there is no mechanical connection between the operators steering wheel and the motor actuator. The electric motor actuator generates the torque required to turn a vehicle's road wheels. However, in an electrical power assist steering system (referred to as EPAS), there is a mechanical connection between the steering wheel and the motor actuator wherein the motor actuator assists a driver's applied torque. A precise level of generated electrical current is essential to enable the motor actuator to produce an appropriate magnitude of torque for either a steer-by-wire or an electric power assist steering system. The magnitude and direction of torque generated by the motor actuator is a function of a number of variables including a steering wheel angle input, the vehicle's road wheel angle, and an electric motor actuator current signal which is generated by a motor driver circuit. Although generally not compensated for, the appropriate magnitude of applied torque is also affected by factors such as temperature fluctuations, component-to-component variations, wear of components, and other factors. In an effort to more precisely match motor current to the desired torque in view of the aforementioned variables, designers of steer-by-wire systems have introduced devices which measure the amount of electric current generated by the motor driver circuit and which compensate the measured current by a predetermined value or "offset".

However, in the above-mentioned prior art steering systems, no compensation is provided for environmental factors such as temperature and other sources of errors in the applied current which can change over time. The accuracy of the current compensation is thus severely limited in these systems. The error in compensation causes an inappropriate amount of current to be applied to the motor actuator resulting in either too much or too little steering torque being applied. There is therefore a need for a steering system that will take into account environmental factors, and other variables including time dependent variables when compensating the current applied to a motor actuator for steer-by-wire and EPAS systems.

SUMMARY OF THE INVENTION

It is a general object of the present invention to provide an improved steering control system in which the above-mentioned problems are addressed. A more specific object of the present invention is to provide a steering. control system which continuously monitors a control signal and an electric current applied to the motor actuator so as to improve the quality of current compensation in a steer-by-wire or EPAS system.

In order to achieve the above mentioned objects, there is provided according to the present invention a steering control system for a vehicle having an electric motor actuator, a motor driver circuit for generating and applying an electric current from the motor driver circuit and generating a feedback current signal. The steering control system includes a steering wheel angle sensor for sensing a steering wheel angle and generating a steering wheel angle signal; a vehicle road wheel angle sensor for sensing a vehicle's road wheel angle and generating a vehicle road wheel angle signal; a controller for setting an offset current signal and for processing the feedback current signal. The steering wheel angle signal, and the road wheel angle signal are used to generate a control signal for the motor driver circuit. The controller compares the control signal to a predetermined threshold value and subtracts the offset current signal from the measured electric current which is applied to the motor actuator when the control signal is greater than the predetermined threshold value. The offset current signal is set equal to an initial offset value when the control signal is less than the predetermined threshold value.

According to the present invention, the controller receives the generated steering wheel angle signal, road wheel angle signal, and feedback current signal to generate the control signal. The control signal is applied to the motor driver circuit and the motor driver circuit generates an electric current which is applied to the motor actuator. The current sensor measures and generates the feedback current to the controller. The controller continuously monitors the control signal and electric current to determine an adequate amount of compensation for the steering control system. Thus, the compensation of the electric current is consistently updated to reflect changes in the steering system during operation.

These and other advantages, features and objects of the invention will become apparent from the drawings, detailed description and claims which follow.

DESCRIPTION OF THE PREFERRED EMBODIMENT

Figure 1:
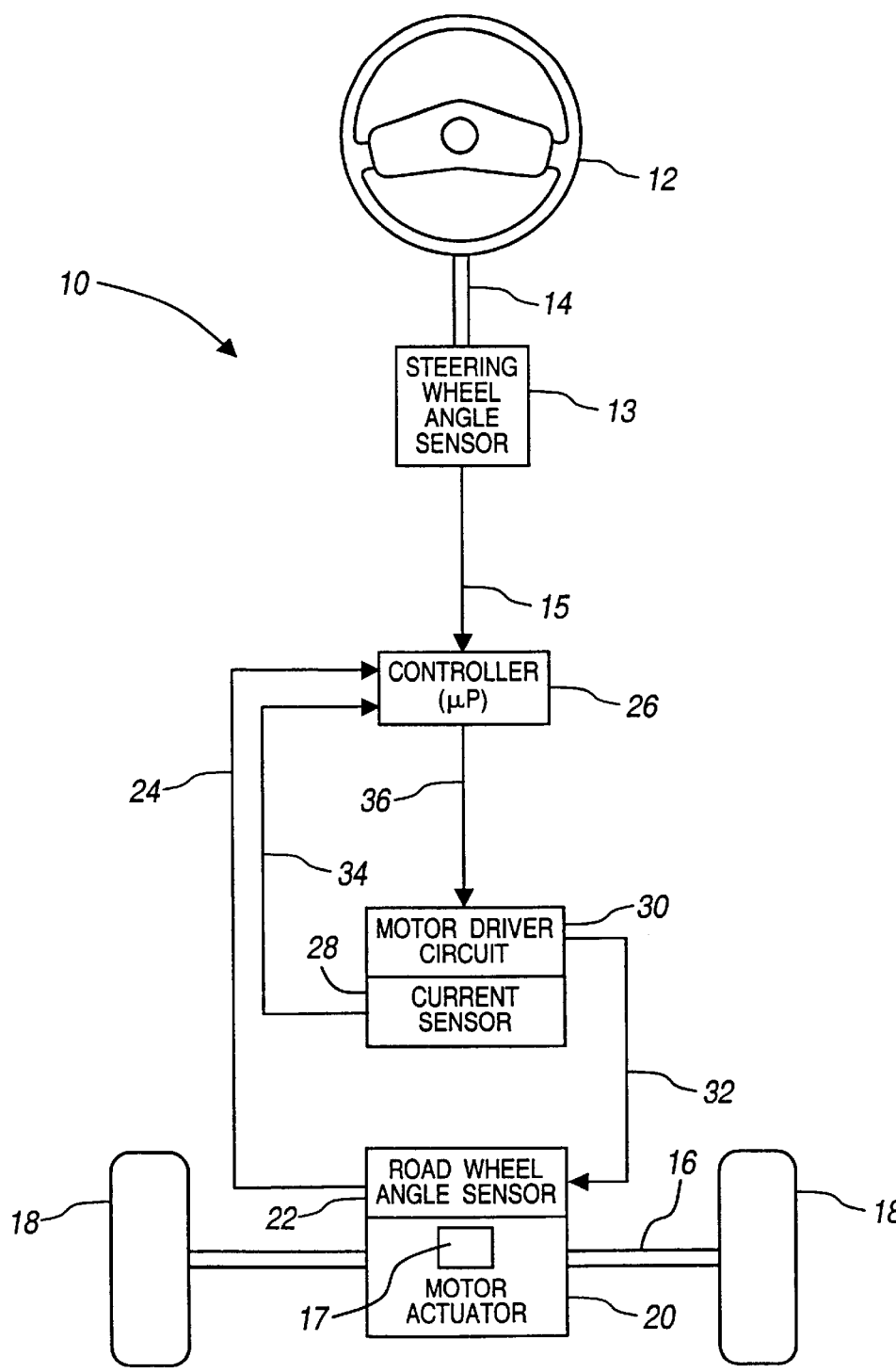
FIG. 1 is a schematic illustration of a steering control system for a vehicle according to the present invention.

Referring to FIG. 1, a steering control system 10 for a vehicle according to the present invention includes a steering wheel 12 connected to an input shaft 14. A pinion gear 17 has gear teeth which are meshingly engaged with gear teeth (not shown) on a linear steering member or rack 16. The rack 16 is coupled to a vehicle's road wheels 18 through a steering linkage in a known manner. The pinion gear 17 together with the rack 16 forms a rack and pinion gear set. The rotation of the pinion gear 17 is translated into lateral movement of the rack 16 causing steering angle changes for road wheels 18.

When the steering wheel 12 is turned, a steering wheel angle sensor 13 senses a steering wheel angle of the steering wheel 12 and generates a steering wheel angle signal 15 for a controller 26. In the preferred embodiment, the steering wheel angle sensor 13 is an absolute steering wheel angle sensor, wherein the steering wheel angle signal 15 is an analog signal, meaning a signal is produced as the steering wheel 12 is turned which identifies the steering position of the steering wheel 12. A second embodiment of the steering wheel angle sensor 13 is a relative steering wheel angle sensor wherein the steering angle signal 15 is a digital signal generated by an algorithm that estimates the change in steering wheel position in relation to a specified reference point. A road wheel angle sensor 22 is mechanically coupled to a motor actuator 20 and generates an output related to the turning angle of the road wheels 18. In the preferred embodiment, the road wheel angle sensor 22 is either a digital or analog encoder. In the case of the digital encoder, the motor actuator 20 generates electrical pulses which are applied to the digital encoder. In the case of the analog encoder, the motor actuator 20 generates an analog signal which is applied to the analog encoder. Concurrently with the turning of the steering wheel 12, the motor actuator 20 is energized and an output gear (not shown) of the motor actuator 20 begins to rotate. The angle and number of rotations of the motor actuator 20 corresponds directly with a turning angle of the road wheels 18. The road wheel angle sensor 22 senses the angle and number of rotations of the output gear (not shown) of the motor actuator 20 and generates a road wheel angle signal 24 for the controller 26. The controller 26 processes the steering wheel angle signal 15, the road wheel angle signal 24 and a feedback current signal 34 to generate a control signal 36. A current sensor 28 generates the feedback current signal 34. The control signal 36 is applied to a motor driver circuit 30. The motor driver circuit 30 generates an electric current 32 for a motor actuator 20. As the electric current 32 is applied to the motor driver circuit 30, the current sensor 28 continuously measures the electric current 32. The current sensor 28 generates the feedback current signal 34 which is applied to the controller 26. Simultaneously, the rack and pinion gear set converts the rotary motion of the steering wheel 12 into linear motion of the rack 16. When the rack 16 moves linearly, the road wheels 18 pivot about their associated steering axes and the vehicle is steered. The motor actuator 20 is connected with the rack 16 through a known manner. The motor actuator 20, when energized, provides torque to enable the vehicle operator to steer the vehicle.

Figure 2:
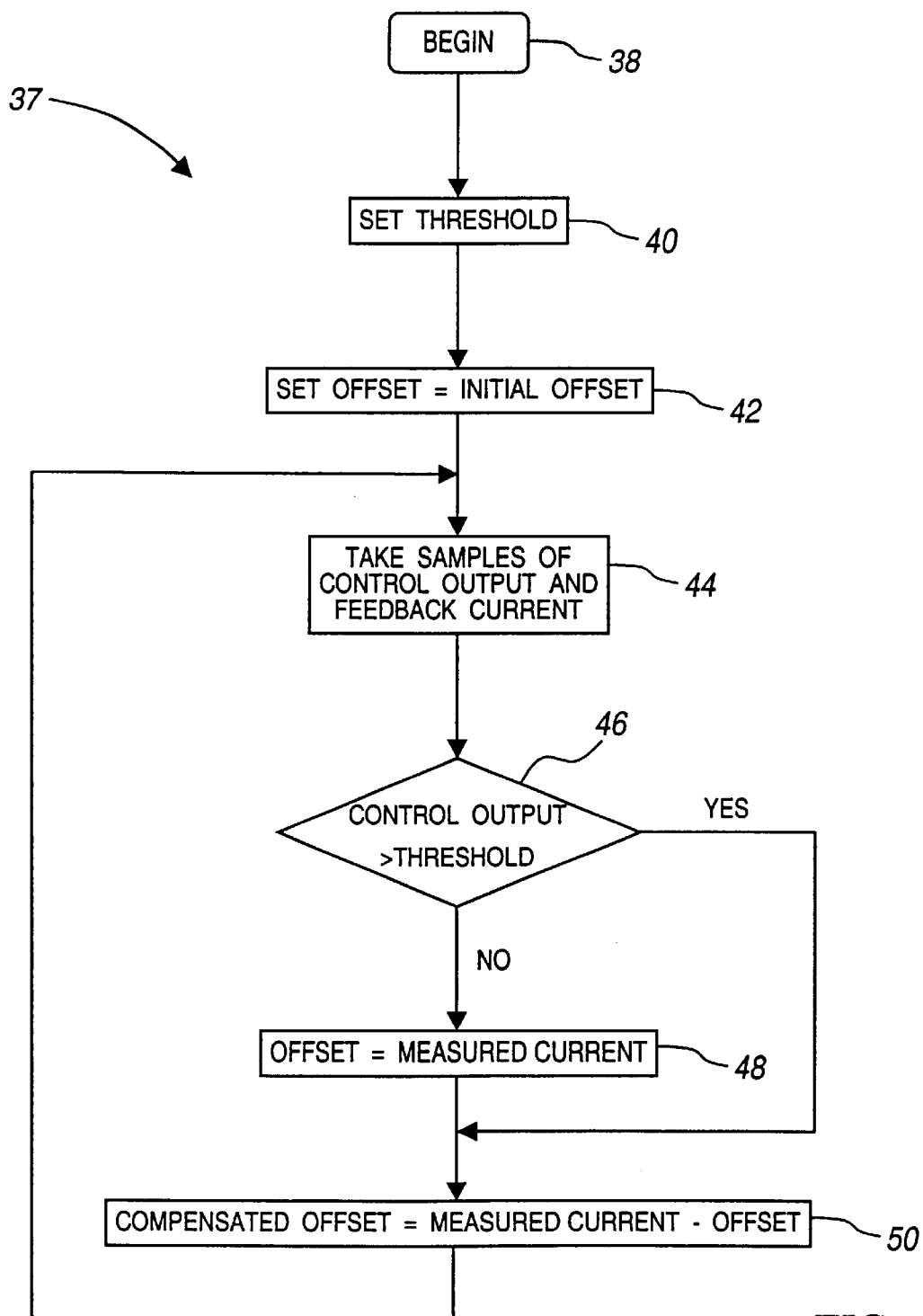
FIG. 2 is a flowchart of a compensation method performed by the controller used in the system according to this invention.

Referring to FIG. 2, a flowchart of a compensation method performed by the controller 26 in the present invention. The controller 26 in a preferred embodiment has permanent and temporary memory storage capabilities. A step 38 is the entry point for the method 37. At a step 40 the controller 26 is permanently programmed with a predetermined threshold value which is determined by vehicle testing. At a step 42 the controller 26 is permanently programmed with an initial offset value which functions as a default amount of offset within the steering control system 10. The initial offset value is automatically subtracted from the electric current 32 during system operation when the steering control system 10 has not received an adequate amount of information to determine a precise amount of required compensation. For example, when the vehicle is initially powered up, the steering wheel angle signal 15, the road wheel angle signal 24, and the feedback current signal 34 have not been generated which causes a zero output for the control signal 36 thereby rendering the precise amount of required compensation in the system undeterminable.

At a step 44 the controller 26 takes samples of the generated control signal 36 by processing the generated steering wheel angle signal 15, road wheel angle signal 24, and feedback current signal 34. Step 44 occurs when a vehicle operator turns the steering wheel 12. At a step 46 the controller 26 compares the control signal 36 to the predetermined threshold value. When the control signal 36 is less than the predetermined threshold value, the sampled feedback current signal 34 is temporarily stored and set as an offset current signal at step 48. At a step 50 the offset current signal is subtracted from the electric current 32 which is generated by the motor driver circuit 30 for the motor actuator 20. In the preferred embodiment the electric current 32 is pulse-width-modulated. When the control signal 36 is greater than the predetermined threshold value at step 46, the controller 26 will set the offset current signal equal to the initial offset value and subtract the initial offset value from the electric current 32 at step 50, thereby improving the quality of current compensation. The method then loops back to step 44.

Although the present invention has been described with regard to a steer-by-wire system, the invention is not limited to such a system. The present invention may be used with equal utility in other embodiments and is not limited to those embodiments disclosed, and variations and modifications may be made without departing from the scope of the present invention.

What is claimed is:

1. A vehicle steering control system of the type including an electric motor actuator, a motor driver circuit for generating and applying an electric current to the motor actuator, a current sensor for measuring the electric current from the motor driver circuit and generating a feedback current signal, said steering control system comprising:
   a steering wheel angle sensor for sensing a steering wheel angle and generating a steering wheel angle signal;
   a vehicle road wheel angle sensor for sensing a vehicle's road wheel angle and generating a vehicle road wheel angle signal; and
   a controller for setting an offset current signal and for processing the feedback current signal, the steering wheel angle signal, and the road wheel angle signal to generate a control signal for the motor driver circuit and the controller for comparing the control signal to a predetermined threshold value and subtracting the offset current signal from the electric current when the control signal is greater than the predetermined threshold value and the processor for comparing the control signal to a predetermined threshold value and setting the offset current signal equal to the initial offset value when the control signal is less than the predetermined threshold value.

2. A steering system, according to claim 1, wherein the vehicle steering system is a steer-by-wire system.

3. A steering system, according to claim 1, wherein the vehicle steering system is an electrical power assist steering system.

4. A steering system, according to claim 1, wherein the steering wheel angle sensor is an absolute steering wheel angle sensor.

5. A steering system, according to claim 1, wherein the steering wheel angle sensor is a relative steering wheel angle sensor.

6. A steering system, according to claim 1, wherein the road wheel angle sensor is a digital encoder which senses the angle and number of rotations of an output gear.

7. A steering system, according to claim 1, wherein the road wheel angle sensor is an analog encoder which senses the angle and number of rotations of an output gear.

8. A steering system, according to claim 1, wherein the controller has permanent and temporary memory storage wherein the offset current signal is stored in temporary memory and the initial offset value and predetermined threshold value are stored in permanent memory.

9. A method for compensation of a measured current in a vehicle steering control system of the type including an electric motor actuator, a motor driver circuit for generating and applying an electric current to the motor actuator, a current sensor for measuring the electric current from the motor driver circuit and generating a feedback current signal, said steering system comprising the steps of:

storing a predetermined threshold value in permanent memory;

storing an initial offset value as a default amount of offset and storing the initial offset value in permanent memory;

retrieving samples of a control signal by processing a generated steering wheel angle signal, road wheel angle signal, and feedback current signal; and comparing the control signal to a predetermined threshold value and subtracting the offset current signal from the electric current when the control signal is greater than the predetermined threshold value and comparing the control signal to a predetermined threshold value and setting the offset current signal equal to the initial offset value when the control signal is less than the predetermined threshold value.

10. A method according to claim 9, wherein the step of retrieving samples of a control signal by processing a generated steering wheel angle signal, road wheel angle signal, and feedback current signal occurs when a vehicle operator turns a steering wheel.

* * * * *